(12) United States Patent
Ohmae et al.

(10) Patent No.: US 12,037,964 B2
(45) Date of Patent: Jul. 16, 2024

(54) HYDROGEN ENGINE

(71) Applicant: TOYOTA JIDOSHA KABUSHIKI KAISHA, Aichi-ken (JP)

(72) Inventors: Kazuhiro Ohmae, Atsugi (JP); Jun Miyagawa, Numazu (JP); Shiro Tanno, Kawasaki (JP); Shinji Harada, Shizioka-ken (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 18/504,168

(22) Filed: Nov. 8, 2023

(65) Prior Publication Data

US 2024/0159205 A1    May 16, 2024

(30) Foreign Application Priority Data

Nov. 10, 2022   (JP) .................................. 2022-180266

(51) Int. Cl.
*F02M 21/02*    (2006.01)
*F02M 57/06*    (2006.01)

(52) U.S. Cl.
CPC ........ *F02M 21/0206* (2013.01); *F02M 57/06* (2013.01); *F02M 2200/44* (2013.01); *F02M 2200/50* (2013.01)

(58) Field of Classification Search
CPC ............... F02M 21/0206; F02M 57/06; F02M 2200/44; F02M 2200/50
USPC ..................................................... 123/294
See application file for complete search history.

(56) References Cited

U.S. PATENT DOCUMENTS

| 5,829,407 | A | 11/1998 | Watson et al. | |
|---|---|---|---|---|
| 6,446,597 | B1 * | 9/2002 | McAlister | .......... F02M 63/0007 123/297 |
| 7,117,849 | B1 * | 10/2006 | Reatherford | ....... F02M 21/0275 239/132.3 |
| 2004/0250797 | A1 * | 12/2004 | Shetley | ................. F02D 19/066 123/527 |

FOREIGN PATENT DOCUMENTS

| GB | 2553317 A | 3/2018 |
|---|---|---|
| JP | 2002-221037 A | 8/2002 |
| JP | 2007-162633 A | 6/2007 |

* cited by examiner

*Primary Examiner* — Mahmoud Gimie
(74) *Attorney, Agent, or Firm* — HAUPTMAN HAM, LLP (57) ABSTRACT

A hydrogen engine in which hydrogen gas is supplied into a combustion chamber as fuel, comprises: an injector for injecting hydrogen gas; a pressure accumulation chamber communicating with an injection hole of the injector; a communication hole communicating with the pressure accumulation chamber and the combustion chamber; and a pressure accumulation chamber defining portion provided between the injector and the combustion chamber and defining the pressure accumulation chamber and the communication hole. The pressure accumulation chamber defining portion is formed separately from the injector and has a thermal conductivity equal to or higher than a thermal conductivity of a combustion chamber wall defining the combustion chamber.

12 Claims, 11 Drawing Sheets

FIG. 14B

HYDROGEN ENGINE

RELATED APPLICATIONS

The present application claims priority of Japanese Patent Application No. 2022-180266 filed Nov. 10, 2022, the disclosure of which is hereby incorporated by reference herein in its entirety.

FIELD

The present disclosure relates to a hydrogen engine.

BACKGROUND

Conventionally, an engine in which gaseous fuel is directly injected into a combustion chamber has been known (JP 2007-162633 A, JP 2002-221037 A). In particular, JP 2007-162633 A discloses an engine in which hydrogen gas is used as gaseous fuel. Further, in the rotary engine described in JP 2007-162633 A, the hydrogen injector is arranged so as to face the working chamber in the retard side from the compressed top dead center 100°, whereby even if premature ignition (pre-ignition) occurs in the working chamber, damage or the like to the hydrogen injector is reduced, since the hydrogen injector is located at the end of a flame or pressure wave.

SUMMARY

Since hydrogen has a high combustion speed, a low minimum ignition energy, and a wide combustible range in a mixing ratio with air, the flame easily reaches the vicinity of the wall surface constituting the combustion chamber. Therefore, if the hydrogen injector is disposed so as to face the working chamber, even if the hydrogen injector is located where the flame or the pressure wave has difficulty reaching, it is not possible to sufficiently reduce the possibility that the hydrogen injector may be damaged due to the heat in the combustion chamber.

In view of the above problems, an object of the present disclosure is to reduce the possibility of an injector for injecting hydrogen gas being damaged due to the heat in a combustion chamber.

The gist of the present disclosure is as follows.

(1) A hydrogen engine in which hydrogen gas is supplied into a combustion chamber as fuel, comprising:
an injector for injecting hydrogen gas;
a pressure accumulation chamber communicating with an injection hole of the injector;
a communication hole communicating with the pressure accumulation chamber and the combustion chamber; and
a pressure accumulation chamber defining portion provided between the injector and the combustion chamber and defining the pressure accumulation chamber and the communication hole, wherein
the pressure accumulation chamber defining portion is formed separately from the injector and has a thermal conductivity equal to or higher than a thermal conductivity of a combustion chamber wall defining the combustion chamber.

(2) The hydrogen engine according to above (1), wherein one or more of the communication holes are provided, and at least one of the communication holes is formed so as to have an axis that is angled with respect to an axis of the injection hole of the injector.

(3) The hydrogen engine according to above (2), further comprising a piston reciprocating in a cylinder defining the combustion chamber, wherein
at least one of the communication holes is formed so as to have an axis that extends obliquely to a piston side in an injection direction with respect to the axis of the injection hole of the injector.

(4) The hydrogen engine according to above (2) or (3), further comprising a spark plug arranged to be exposed to the combustion chamber and igniting a mixture of hydrogen gas and air, wherein
at least one of the communication holes is formed to have an axis that is inclined with respect to the axis of the injection hole of the injector so as to extend away from an ignition portion of the spark plug.

(5) The hydrogen engine according to above (4), wherein two or more communication holes are provided, and
at least two of the communication holes are formed so as to have axes extending in directions spreading on both sides across the ignition portion of the spark plug when viewed in an axial direction of the combustion chamber.

(6) The hydrogen engine according to any one of above (1) to (5), wherein the pressure accumulation chamber defining portion is configured as a part of a cylinder head defining the combustion chamber.

(7) The hydrogen engine according to any one of above (1) to (5), wherein the pressure accumulation chamber defining portion is configured as a member separate from a cylinder head defining the combustion chamber.

(8) The hydrogen engine according to any one of above (1) to (7), wherein the communication hole is formed such that a total flow path cross-sectional area thereof is smaller than a flow path cross-sectional area of the pressure accumulation chamber so as to be a throttle with respect to the pressure accumulation chamber.

(9) The hydrogen engine according to above (8), wherein the communication hole is formed such that the total flow path cross-sectional area thereof is larger than a flow path cross-sectional area of a throttle portion of the injector so that a flow rate of the hydrogen gas in the throttle portion of the injector becomes a predetermined flow rate when the hydrogen gas is injected from the injector.

(10) The hydrogen engine according to any one of above (1) to (9), wherein the pressure accumulation chamber is formed to have the same axis as the axis of the injection hole of the injector.

(11) The hydrogen engine according to any one of above (1) to (10), further comprising a check valve provided in the pressure accumulation chamber, wherein
the check valve permits a flow of fluid from the injector to the communication hole and prohibits a flow of fluid from the communication hole to the injector.

(12) The hydrogen engine according to above (11), further comprising a biasing member that biases the check valve toward the injection hole of the injector, wherein
the biasing member is fixed to the injector.

DESCRIPTION OF EMBODIMENTS

Hereinafter, embodiments will be described in detail with reference to the drawings. In the following description, the same reference numerals are given to the same elements.

First Embodiment

<Overall Configuration of Engine>

Figure 1:
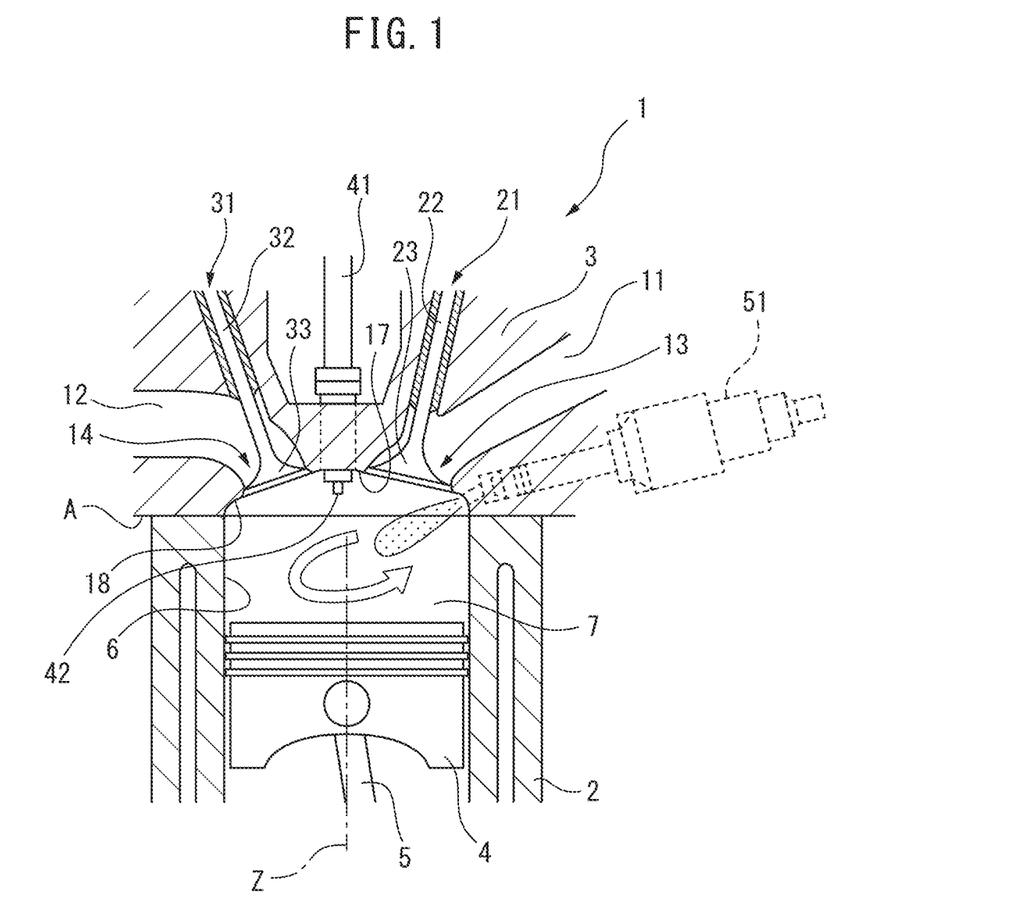
FIG. 1 is a partial cross-sectional view schematically showing an engine according to a first embodiment.

First, with reference to FIGS. 1 and 2, an overall configuration of a hydrogen engine (hereinafter, also simply referred to as an "engine") 1 according to the first embodiment will be described. In a hydrogen engine, hydrogen gas is directly injected into a combustion chamber as fuel. FIG. 1 is a partial cross-sectional view schematically showing the engine 1 according to the present embodiment. As shown in FIG. 1, the engine 1 includes a cylinder block 2, a cylinder head 3, pistons 4, and connecting rods 5.

The cylinder block 2 includes a plurality of cylinders 6 arranged side by side. The cylinder head 3 is arranged so as to contact the cylinder block 2 in a contact plane A, and is arranged so as to close one end of the cylinder 6 formed in the cylinder block 2. The cylinder block 2 and the cylinder head 3 are formed of a metal such as an aluminum alloy or cast iron.

The piston 4 is arranged to reciprocate in a cylinder 6 formed in the cylinder block 2. The piston 4 is connected to the connecting rod 5 via a piston pin. The connecting rod 5 is connected to a crankshaft (not shown) via a crankpin. The connecting rod 5 serves to convert the reciprocating movement of the piston 4 into a rotational movement of the crankshaft. The wall surface of the cylinder 6 of the cylinder block 2, the cylinder head 3, and the piston 4 define a combustion chamber 7 in which a mixture of air and hydrogen gas is combusted. In the combustion chamber 7, a swirling flow of the air-fuel mixture is generated in a direction indicated by an arrow in FIG. 1.

Figure 2:
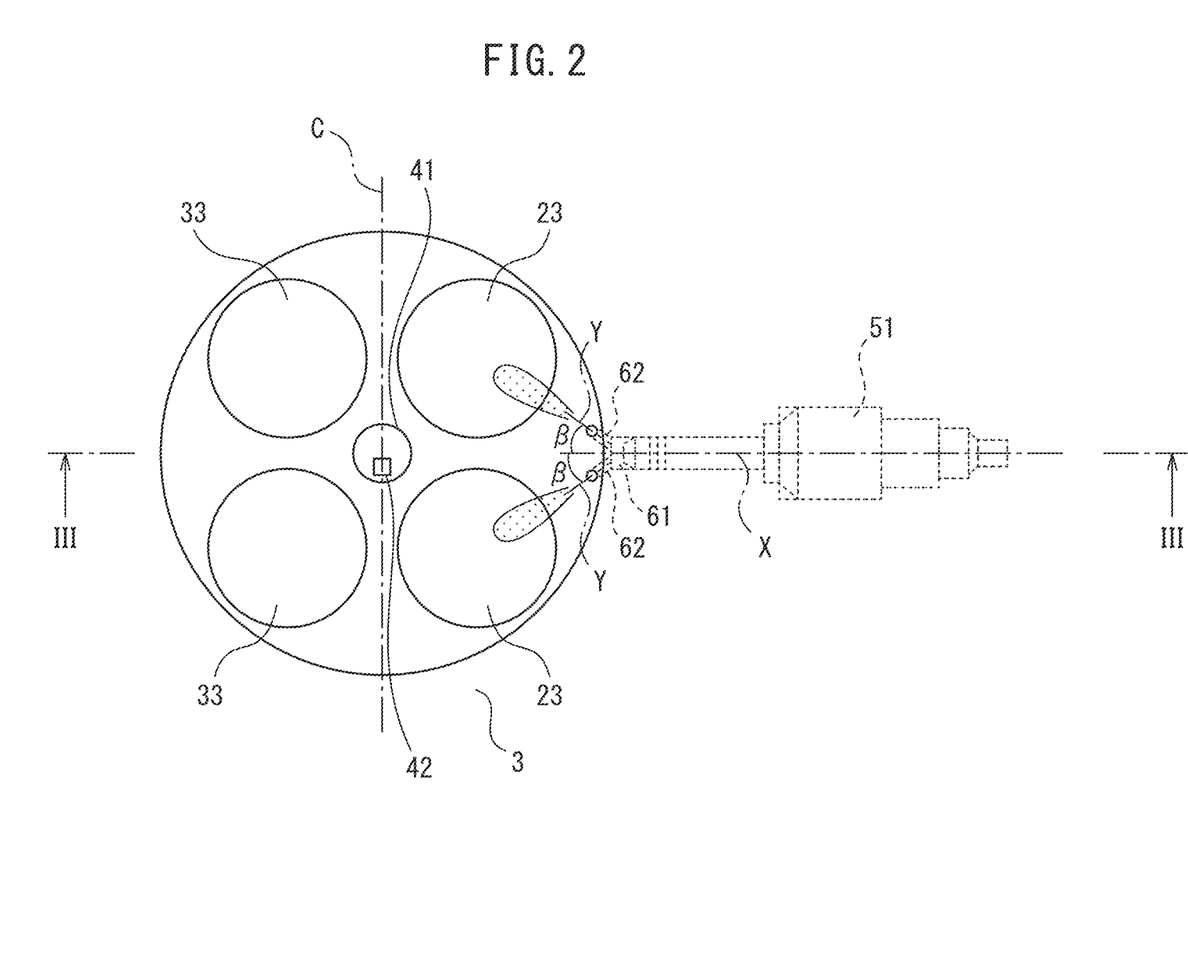
FIG. 2 is a partial bottom view schematically showing a bottom surface of a cylinder head.

FIG. 2 is a partial bottom view schematically showing a bottom surface of the cylinder head 3. In particular, FIG. 2 schematically shows a portion of the cylinder head 3 positioned to close one cylinder 6. Further, in FIG. 2, an injector 51, although a pressure accumulation chamber 61 and communication holes 62 which will be described later are depicted, they are not visible in nature from the bottom surface side of the cylinder head 3 since they are disposed inside the cylinder head 3, but they are depicted for easy understanding of the explanation.

As shown in FIGS. 1 and 2, an intake port 11 and an exhaust port 12 are formed in the cylinder head 3. The intake port 11 faces the combustion chamber 7 and communicates with the combustion chamber 7 via an intake opening 13 formed in the cylinder head 3. Similarly, the exhaust port 12 faces the combustion chamber 7 and communicates with the combustion chamber 7 via an exhaust opening 14 formed in the cylinder head 3.

As shown in FIG. 2, in the present embodiment, two intake openings 13 and two exhaust openings 14 are provided for each combustion chamber 7. The two intake openings 13 are arranged side by side in the same direction as the direction in which the plurality of cylinders 6 are arranged side by side (hereinafter, also referred to as "cylinder alignment direction"). Similarly, the two exhaust openings 14 are arranged side by side in the same direction as the cylinder alignment direction. Two intake openings 13 are arranged on one side and two exhaust openings 14 are arranged on the other side with respect to a central plane C extending in the cylinder alignment direction through the center of each cylinder 6.

As shown in FIG. 1, the cylinder head 3 is formed such that the upper surface of the combustion chamber 7 has two inclined surfaces, an intake-side inclined surface 17 and an exhaust-side inclined surface 18. The intake-side inclined surface 17 is formed so that a height from the contact plane A (a length from the contact plane A in the axial line Z direction of the cylinder 6) increases from the edge portion on the intake opening side toward the central plane C. The exhaust-side inclined surface 18 is formed so that the height from the contact plane A increases from the edge portion on the exhaust opening side toward the central plane C. Therefore, the upper surface of the combustion chamber 7 is inclined so as to be highest in the central plane C.

Further, the cylinder head 3 is provided with an intake valve 21 for opening and closing the intake opening 13, an exhaust valve 31 for opening and closing the exhaust opening 14, an spark plug 41 for igniting the air-fuel mixture in the combustion chamber 7, and an injector 51 for directly injecting hydrogen gas into the combustion chamber 7.

The intake valve 21 includes a valve stem 22 and a valve body 23 fixed to one end of the valve stem 22. The intake valve 21 is arranged in the cylinder head 3 so as to be slidable in the direction in which the valve stem 22 extends, i.e., in the axial direction of the intake valve 21. The intake valve 21 is lifted in its axial direction by an intake valve mechanism (not shown).

Similarly, the exhaust valve 31 includes a valve stem 32 and a valve body 33 fixed to one end of the valve stem 32. The exhaust valve 31 is arranged in the cylinder head 3 so as to be slidable in the direction in which the valve stem 32 extends, i.e., in the axial direction of the exhaust valve 31.

The exhaust valve 31 is lifted in its axial direction by an exhaust valve operating mechanism (not shown).

The spark plug 41 is attached to the cylinder head 3 so as to be positioned on the upper surface of the combustion chamber 7 substantially at the center of the combustion chamber 7 when viewed in the axis Z (i.e., the axis of the combustion chamber 7) direction of the cylinder 6. Thus, the spark plug 41 is arranged so as to be exposed to the combustion chamber 7. The spark plug 41 has, at its end, an electrode 42 which functions as an ignition unit for igniting the air-fuel mixture. Therefore, the electrode 42 of the spark plug 41 is located near the upper surface of the combustion chamber 7 at substantially the center of the combustion chamber 7 when viewed in the axis Z direction of the cylinder 6.

<Configuration around the Injector>

Figure 3:
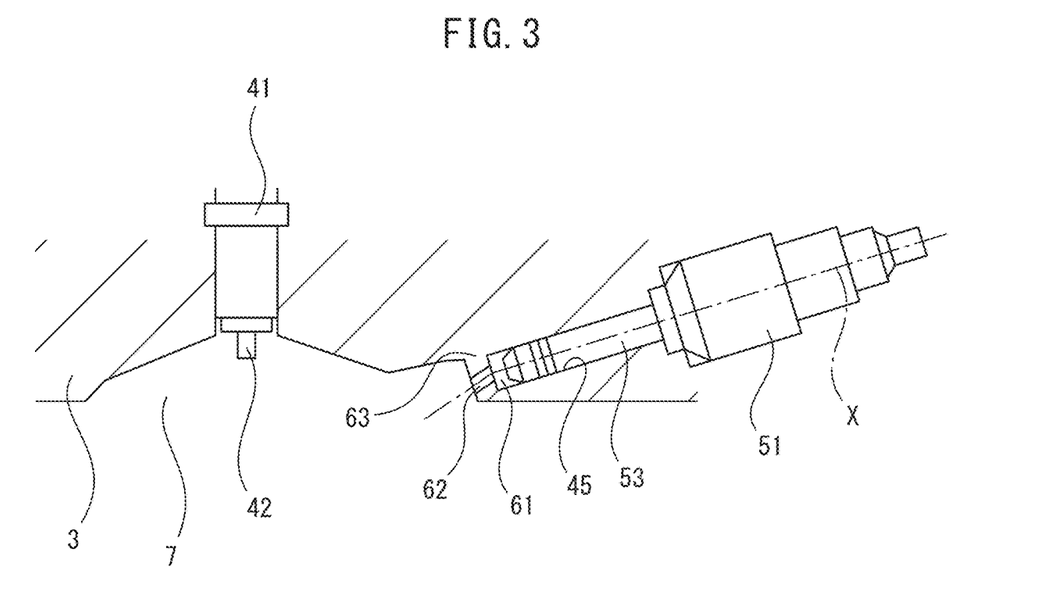
FIG. 3 is an enlarged cross-sectional view, taken along the line III-III of FIG. 2, showing a portion of the cylinder head around a spark plug and injector.
Figure 4:
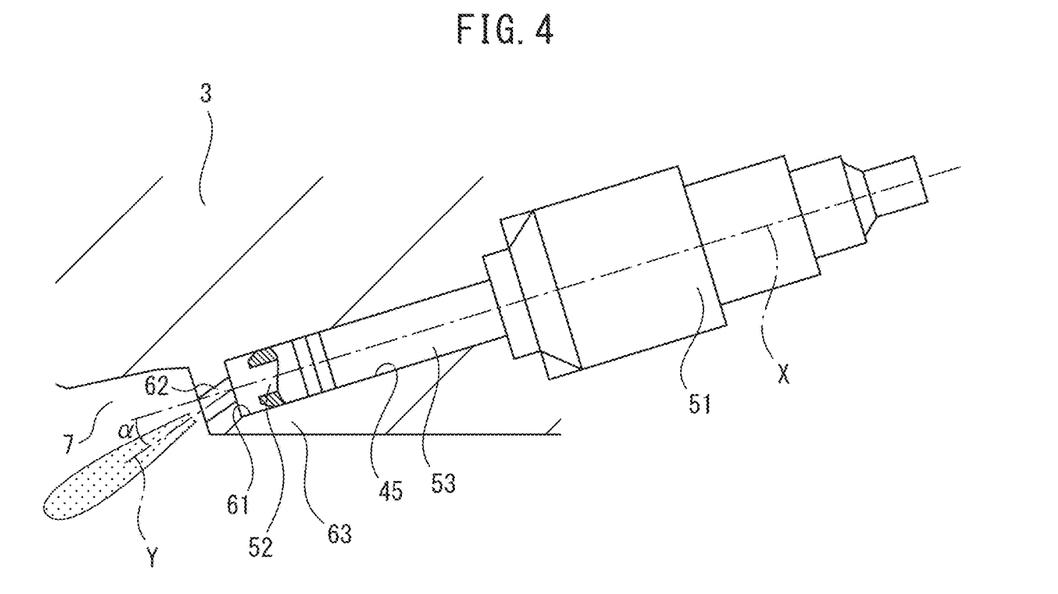
FIG. 4 is an enlarged cross-sectional view of a portion of the cylinder head around the injector.

Next, the configuration of the cylinder head 3 around the injector 51 will be described with reference to FIGS. 3 and 4 in addition to FIGS. 1 and 2. FIG. 3 is an enlarged cross-sectional view taken along the line III-III of FIG. 2, showing a portion of the cylinder head 3 around the spark plug 41 and the injector 51. FIG. 4 is an enlarged cross-sectional view of a portion of FIG. 3, showing a portion of the cylinder head 3 around the injector 51. In FIG. 4, only the tip of the injector 51 is depicted as representing a cross section.

As shown in FIG. 2, the injector 51 is disposed on the intake opening side with respect to the central plane C. In particular, in the present embodiment, the injector 51 is arranged to inject hydrogen gas between the two intake openings 13 and in the vicinity of the outer periphery of the cylinder 6. It should be noted that the injector 51 does not necessarily have to be provided between the intake openings 13, and may be disposed in the cylinder head 3 between the exhaust openings 14 or in the vicinity of the center of the combustion chamber 7.

Further, as shown in FIG. 4, the injector 51 has an injection hole 52 for injecting hydrogen gas at the tip thereof. The injection hole 52 is formed so that its axis is the same as the axis of the injector 51 (in the figure, the axis of the injector 51 and the axis of the injection hole 52 are both represented by X). In the present embodiment, the injection hole 52 is formed such that the flow path cross-sectional area in a cross section perpendicular to the main flow direction of the hydrogen gas is the smallest in the injector 51. Therefore, in the present embodiment, the injection hole 52 functions as a throttle portion for the flow of the hydrogen gas in the injector 51. It should be noted that the injection hole 52 may be formed such that its axis is oriented in a direction different from the axis X of the injector 51. In addition, the injector 51 may be formed so that the flow path cross-sectional area in the injector 51 is the smallest around a valve body of a needle valve that opens and closes the injection hole 52. In this case, a region around the valve body, such as a needle valve, functions as a throttle portion for the flow of the hydrogen gas.

In addition, as shown in FIGS. 3 and 4, the injector 51 is disposed in a hole 45 formed in the cylinder head 3. The hole 45 is open to the outside of the cylinder head 3 so that the injector 51 can be inserted. The hole 45 is formed so that a cross-sectional shape perpendicular to the axial direction thereof is substantially the same as or slightly larger than the cross-sectional shape of the injector 51. In addition, the hole 45 is formed such that the axial length of the portion of the hole 45 having substantially the same cross-sectional shape (in the present embodiment, a circular shape) as the cylindrical portion 53 having a circular cross section narrower than the other portion on the distal end side of the injector 51 is longer than the axial length of the cylindrical portion 53. In addition, the injector 51 is fixed in the hole 45 by any method, for example, by supporting the rear portion of the injector 51 with another member fixed to the cylinder head 3.

As shown in FIGS. 3 and 4, between the injector 51 and the combustion chamber 7, a pressure accumulation chamber 61, a communication hole 62, and a pressure accumulation chamber defining portion 63 that defines the pressure accumulation chamber 61 and the communication hole 62 are provided. As shown in FIG. 4, the pressure accumulation chamber 61 communicates with the injection hole 52 of the injector 51 and communicates with the communication hole 62. In addition, the communication hole 62 communicates with the pressure accumulation chamber 61 and also communicates with the combustion chamber 7. In particular, in the present embodiment, the communication hole 62 is formed so as to open to an end surface of the pressure accumulation chamber 61 opposite to the injector 51 side. However, the communication hole 62 may be formed so as to open to the annular side surface of the pressure accumulation chamber 61, in addition to the end surface of the pressure accumulation chamber 61 on the side opposite to the injector 51 side.

The pressure accumulation chamber 61 is formed so as to have the same axis as the axis X of the injection hole 52 of the injector 51. Therefore, the annular side wall defining the pressure accumulation chamber 61 is prevented from becoming the flow path resistance to the hydrogen gas injected from the injector 51. In addition, in the present embodiment, the pressure accumulation chamber 61 has a cross-sectional shape substantially the same as the cross-sectional shape of the tip of the injector 51 provided with the injection hole 52 (i.e., the cross-sectional shape of the cylindrical portion 53) in a cross section perpendicular to the axis X. Therefore, in the present embodiment, the pressure accumulation chamber 61 has a circular cross-sectional shape. In addition, the flow path cross-sectional area of the pressure accumulation chamber 61 (i.e., the cross-sectional area in a cross section perpendicular to the axis X) is substantially the same as the cross-sectional area of the tip end of the injector 51. Therefore, the pressure accumulation chamber 61 has a flow path cross-sectional area larger than the flow path cross-sectional area of the injection hole 52 by the thickness of the wall portion around the injection hole 52 of the injector 51. Further, in the present embodiment, the pressure accumulation chamber 61 is formed in the hole 45 of the cylinder head 3, and is formed by the axial length of the portion of the hole 45 having substantially the same cross-sectional shape as the cylindrical portion 53 of the injector 51 being longer than the axial length of the cylindrical portion 53 in the X-axis direction. The pressure accumulation chamber 61 may have a cross-sectional shape other than a circular shape, such as a polygonal shape or an elliptical shape.

It should be noted that the pressure accumulation chamber 61 may be formed to have an axis different from the axis X of the injection hole 52. The pressure accumulation chamber 61 may have a cross-sectional shape different from the cross-sectional shape of the tip end of the injector 51, and the cross-sectional area of the flow path of the pressure accumulation chamber 61 may be larger or smaller than the cross-sectional area of the tip end of the injector 51.

In the present embodiment, two communication holes 62 are provided. In particular, in the present embodiment, as can be seen from FIG. 2, the communication holes 62 are arranged side by side when viewed in the axis Z direction of the cylinder 6. In addition, the cross-sectional shape of the communication hole 62 in a cross section perpendicular to the main flow direction of the hydrogen gas is formed to be substantially circular. In addition, in the present embodiment, the two communication holes 62 are formed so that the cross-sectional shapes thereof have the same shape, and thus the cross-sectional areas thereof are the same as each other. The communication hole 62 may have a cross-sectional shape other than a circular shape, such as a polygonal shape or an elliptical shape.

In addition, the two communication holes 62 are formed so that the total flow path cross-sectional area thereof is smaller than the flow path cross-sectional area of the pressure accumulation chamber 61. As a result, the communication hole 62 acts as a throttle in the flow of the hydrogen gas with respect to the pressure accumulation chamber 61.

In addition, the two communication holes 62 are formed such that the total flow path cross-sectional area thereof is larger than the flow path cross-sectional area of the throttle portion of the injector 51 (in the present embodiment, the injection hole 52) so that the flow rate of the hydrogen gas in the throttle portion of the injector 51 becomes a predetermined flow rate (in the present embodiment, sound velocity) when the hydrogen gas is injected from the injector 51. Specifically, for example, the two communication holes 62 are formed such that the total flow path cross-sectional area thereof is, for example, 1.75 times or more of the flow path cross-sectional area of the throttle portion of the injector 51. As described above, when the hydrogen gas is injected from the injector 51, the flow rate of the hydrogen gas becomes a predetermined flow rate (for example, sound velocity), so that the supply amount of the hydrogen gas into the combustion chamber 7 can be adjusted only based on the time when the injector 51 is opened, and thus the supply amount of the hydrogen gas into the combustion chamber 7 can be easily controlled.

Further, in the present embodiment, as shown in FIGS. 2 and 4, each of the two communication holes 62 is formed so as to have axis Y that is angled with respect to the axis X of the injection hole 52 of the injector 51. In particular, in the present embodiment, as shown in FIG. 4, the axes Y of the two communication holes 62 are inclined toward the piston 4 side (in the direction from the cylinder head 3 toward the cylinder block 2 in the axis Z direction of the cylinder 6) in the injection direction of the hydrogen gas from the injection hole 52 with respect to the axis X of the injection hole 52 of the injector 51. In other words, as shown in FIG. 4, the axes Y of the two communication holes 62 extend obliquely with respect to the axis X of the injector 51 in a cross section including the axis Z of the cylinder 6 and the axis X of the injector 51. The inclination angle α at this time is, for example, 5 to 30°, 7 to 20°, or 10 to 15°.

Further, in the present embodiment, as shown in FIG. 2, the axis Y of the two communication holes 62 extends so as to be inclined away from the electrode 42 of the spark plug 41 with respect to the axis X of the injection hole 52 of the injector 51. In other words, as shown in FIG. 2, the axis Y of each of the two communication holes 62 extends obliquely with respect to the axis X of the injection hole 52 extending through the spark plug 41 when viewed in the axis Z direction of the cylinder 6. The inclination angle β at this time is, for example, 5 to 45°, 7 to 35°, or 10 to 20°. As shown in FIG. 2, the respective axes Y of the two communication holes 62 extend so as to be inclined in mutually opposite directions with respect to the axis X of the injection hole 52 when viewed in the axis Z direction of the cylinder 6. Therefore, in the present embodiment, as shown in FIG. 2, the axes Y of the two communication holes 62 extend in a direction extending to both sides across the electrode 42 of the spark plug 41 when viewed in the axis Z direction of the cylinder 6.

The pressure accumulation chamber defining portion 63 is located around the injector 51, the pressure accumulation chamber 61 and the communication hole 62. In particular, in the present embodiment, the pressure accumulation chamber defining portion 63 is configured as a part of the cylinder head 3. Therefore, the pressure accumulation chamber defining portion 63 is a portion of the cylinder head 3 located around the pressure accumulation chamber 61 and the communication hole 62. Therefore, the pressure accumulation chamber defining portion 63 is formed of the same material as the cylinder head 3 (i.e., the combustion chamber wall defining the combustion chamber 7). Therefore, the pressure accumulation chamber defining portion 63 has the same thermal conductivity as that of the cylinder head 3. On the other hand, the cylinder head 3 is formed separately from the injector 51, and thus the pressure accumulation chamber defining portion 63 is formed separately from the injector 51.

In the hydrogen engine 1 configured as described above, when the hydrogen gas is injected from the injection hole 52 of the injector 51, the injected hydrogen gas is injected through the pressure accumulation chamber 61 and the communication hole 62 from the communication hole 62 into the combustion chamber 7. As described above, the hydrogen gas is injected from the injection hole 52 at a flow velocity such that the flow velocity thereof becomes sound velocity in the throttle portion of the injector 51, and then flows through the pressure accumulation chamber 61 and the communication hole 62 at a velocity slower than sound velocity, and is injected into the combustion chamber 7. When the hydrogen gas is injected from the communication hole 62, the hydrogen gas is injected into the combustion chamber 7 mainly in the axial line Y direction of the communication hole 62.

<Effect>

Incidentally, as described above, hydrogen has a high combustion speed, a low minimum ignition energy, and a wide combustible range in a mixing ratio with air. Therefore, the quenching distance is short, and the flame reaches the vicinity of the wall surface of the combustion chamber 7. Therefore, the temperature of the constituent members exposed to the combustion chamber 7 tends to be relatively high. In addition, since the minimum ignition energy of hydrogen is low, abnormal combustion such as premature ignition (pre-ignition) is likely to occur, and when such abnormal combustion occurs, the constituent members exposed to the combustion chamber 7 are exposed to high temperatures.

On the other hand, in the present embodiment, the pressure accumulation chamber defining portion 63 provided between the injector 51 and the combustion chamber 7 is a part of the cylinder head 3 and has the same thermal conductivity as that of the cylinder head 3, and is therefore cooled together with the cylinder head 3 by coolant or the like flowing in the cylinder head 3. In addition, a pressure accumulation chamber 61 and a communication hole 62 are provided between the injector 51 and the combustion chamber 7. Accordingly, the injector 51 is arranged at a position retracted from the other wall surface defining the combustion chamber 7. Therefore, the flame in the combustion chamber 7 hardly reaches the tip of the injector 51. Therefore, the injector 51 is prevented from being constantly maintained at a high temperature and thus being damaged, and the injector 51 is prevented from being damaged when, for example, premature ignition or the like occurs.

Further, in the present embodiment, the communication hole 62 is formed such that the total flow path cross-sectional area thereof is smaller than the flow path cross-sectional area of the pressure accumulation chamber 61. Since the flow path cross-sectional area of the communication hole 62 is small in this way, the flame in the combustion chamber 7 is less likely to reach the inside of the pressure accumulation chamber 61. Accordingly, this also prevents the injector 51 from being maintained at a high temperature and prevents the injector 51 from being damaged.

In addition, in the present embodiment, the communication hole 62 has the axes Y at an arbitrary angle with respect to the axis X of the injection hole 52 of the injector 51. Therefore, while the injector 51 is disposed at a position retracted from another wall surface defining the combustion chamber 7, the hydrogen gas can be injected in desired directions specified by the axes Y other than the axis X direction of the injection hole 52 of the injector 51. Further, since the stoichiometric air-fuel ratio in the air-fuel mixture of the hydrogen gas is low, it is necessary to supply a large amount of hydrogen gas into the combustion chamber 7, and therefore, it is preferable to increase the cross-sectional area of the injection hole 52 of the injector 51 as much as possible, and therefore it is difficult to make the direction and the shape of the injection hole 52 in the direction and the shape corresponding to the optimum injection direction. On the other hand, in the present embodiment, since the injection is performed in the optimum injection direction in the combustion chamber 7 by the communication hole 62, the injection hole 52 of the injector 51 can be formed so as to extend in the axial line X direction of the injector 51, and the cross-sectional area of the flow path of the injector 51 can be large.

In the present embodiment, the axis Y of the communication hole 62 is inclined toward the piston 4 side (downward in FIGS. 1 and 4) at an inclination angle α with respect to the axis X of the injection hole 52 of the injector 51. Therefore, the hydrogen gas injected into the combustion chamber 7 through the communication hole 62 is prevented from coming into contact with the uneven portion, which is likely to reach a high temperature, on the lower surface of the cylinder head 3 at an early stage, and thus occurrence of abnormal combustion such as premature ignition is suppressed.

Further, in the present embodiment, the axes Y of the communication hole 62 extend so as to be inclined away from the electrode 42 of the spark plug 41 at an inclination angle θ with respect to the axis X of the injection hole 52 of the injector 51. Therefore, the concentration of the air-fuel mixture in the vicinity of the electrode 42 of the spark plug 41 which becomes high in temperature is prevented from becoming high, and thus the possibility of premature ignition occurring in the vicinity of the spark plug 41 is suppressed. In the present embodiment, the axes Y of the two communication holes 62 extend in a direction extending to both sides across the electrode 42 of the spark plug 41. Therefore, a certain amount of air-fuel mixture can be formed around the electrode 42 of the spark plug 41 while suppressing an excessive increase in the concentration of the air-fuel mixture in the vicinity of the electrode 42 of the spark plug 41, and thus the air-fuel mixture can be ignited by the spark plug 41.

<Modification>

In the above-described embodiment, the engine 1 is provided with two communication holes 62 for each injector 51. However, any number of the communication holes may be provided, as long as the number of the communication holes is one or more. Therefore, the engine 1 may be provided with one or more communication holes 62 for each injector 51, and therefore, the engine 1 may be provided with only one communication hole 62 for each injector 51, or may be provided with three or more communication holes 62 for each injector 51.

In addition, in the above-described embodiment, each communication hole 62 is formed so that its axis Y extends at an angle with respect to the axis X of the injection hole 52 of the injector 51. However, all or a part of the one or more communication holes 62 may be formed such that the axis Y thereof extends in the same direction as the axis X of the injection hole 52. Further, at least a part of the communication hole 62 may extend such that the axis Y does not separate from the electrode 42 of the spark plug 41 with respect to the axis X of the injection hole 52.

Further, in the above-described embodiment, the axes Y of the two communication holes 62 are inclined in the axis Z direction of the cylinder 6 at the same inclination angle α with respect to the axis X of the injection hole 52. However, the axes Y of the two communication holes 62 may be inclined in the axis Z direction (i.e., upward or downward direction in FIG. 4) of the cylinder 6 at different inclination angles with respect to the axis X of the injection hole 52. In addition, in the above-described embodiment, the axes Y of the two communication holes 62 are inclined at the same inclination angle β in opposite directions with respect to the axis X of the injection hole 52 when viewed in the axis Z direction of the cylinder 6. However, the axes Y of the two communication holes 62 may be inclined at the same inclination angle in the same direction with respect to the axis X of the injection hole 52 when viewed in the axis Z direction of the cylinder 6 (i.e., both of them may be inclined upward in FIG. 2, or may be inclined downward). Alternatively, the axes Y of the two communication holes 62 may be inclined at different inclination angles in mutually opposite directions or in mutually identical directions with respect to the axis X of the injection hole 52 when viewed in the axis Z direction of the cylinder 6.

Figure 5:
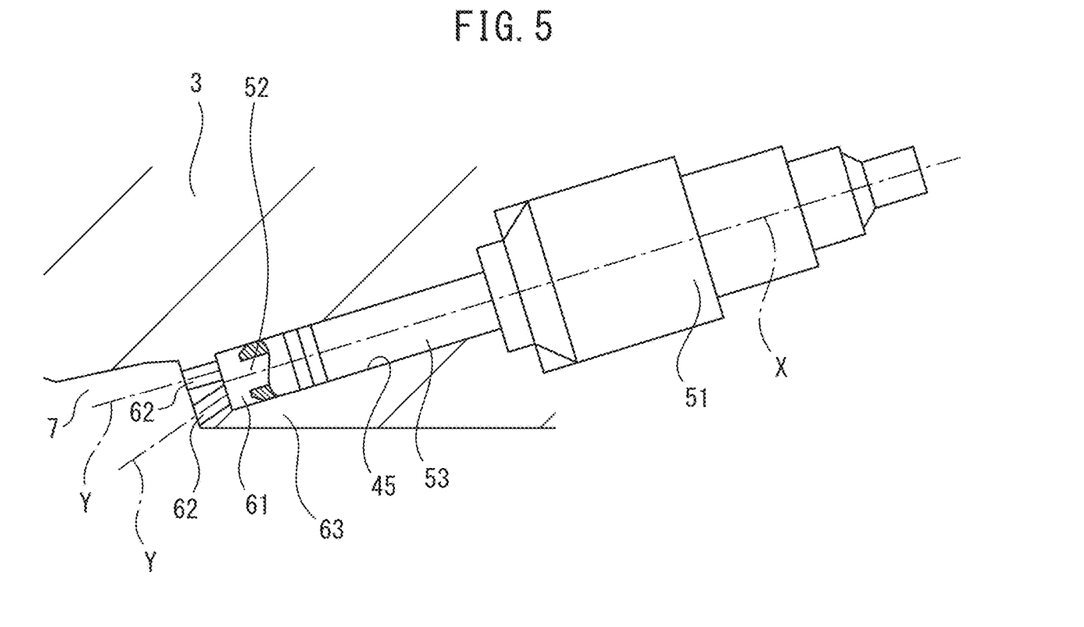
FIG. 5 is an enlarged cross-sectional view similar to FIG. 4, showing a portion of the cylinder head around the injector, according to one modification.

FIG. 5 is an enlarged cross-sectional view, similar to FIG. 4, showing a portion of the cylinder head 3 around the injector 51, according to one modification. In the example shown in FIG. 5, the engine 1 is provided with four communication holes 62 for each injector 51. As shown in FIG. 5, two communication holes 62 are provided side by side in the axis Z direction of the cylinder 6, and these communication holes 62 are inclined at different inclination angles with respect to each other with respect to the axis X of the injection hole 52. In particular, in the present modification, the communication holes 62 are formed such that the inclination angle of the communication holes 62 provided on the opposite side (upper side in the drawing) to the piston 4 is smaller than the inclination angle of the communication holes 62 provided on the piston 4 side (lower side in the drawing). Further, in the present modification, when viewed in the axis Z direction of the cylinder 6, the two communication holes 62 are inclined at the same inclination angle β in opposite directions with respect to the axis X of the injection hole 52. By forming the communication hole 62 in this manner, hydrogen gas can be diffused widely into the combustion chamber 7.

Figure 6:
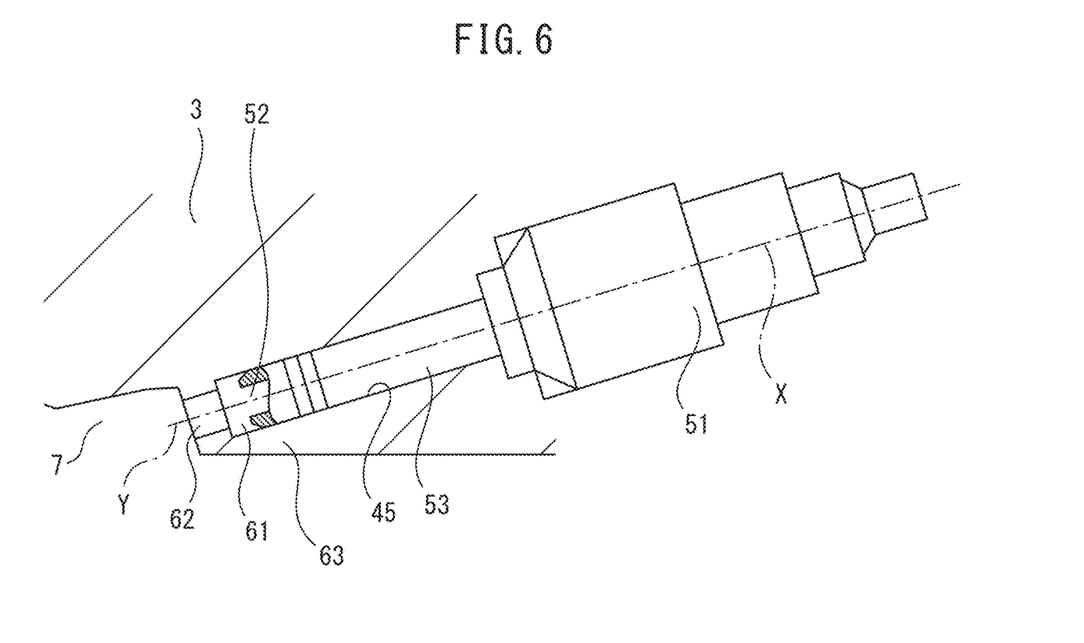
FIG. 6 is an enlarged cross-sectional view similar to FIG. 4, showing a portion of the cylinder head around the injector, according to another modification.

FIG. 6 is an enlarged sectional view, similar to FIG. 4, showing a portion of the cylinder head 3 around the injector 51, according to another modification. In the example shown in FIG. 6, only one communication hole 62 is provided for each injector 51 in the engine 1. In addition, the communication hole 62 is formed so that its axis Y extends on the axis X of the injection hole 52 of the injector 51. By forming the communication hole 62 in this manner, the communication hole 62 can be easily formed.

In the above-described embodiment, the flow path cross-sectional area of the pressure accumulation chamber 61 is formed to be larger than the flow path cross-sectional area of the injection hole 52 of the injector 51. However, the flow path cross-sectional area of the pressure accumulation chamber 61 may be formed to be substantially the same as the flow path cross-sectional area of the injection hole 52 of the injector 51. In addition, in the above-described embodiment, the total flow path cross-sectional area of the plurality of communication holes 62 is formed to be smaller than the flow path cross-sectional area of the pressure accumulation chamber 61. However, in the case where the plurality of communication holes 62 are provided, the plurality of communication holes 62 may be formed such that the total flow path cross-sectional area thereof is substantially the same as the flow path cross-sectional area of the pressure accumulation chamber 61. In addition, in the present embodiment, the communication hole 62 is formed such that the total flow path cross-sectional area thereof is larger than the flow path cross-sectional area of the throttle portion of the injector 51. However, the communication hole 62 may be formed such that its flow path cross-sectional area is substantially the same as the flow path cross-sectional area of the throttle portion of the injector 51.

In the above-described embodiment, the hydrogen engine 1 includes only the injector 51 that directly injects hydrogen gas into the combustion chamber 7. However, the hydrogen engine 1 may include an injector that injects hydrogen gas or other fuel into an intake passage such as the intake port 11 in addition to the injector 51 that injects hydrogen gas directly into the combustion chamber 7.

Second Embodiment

Next, a hydrogen engine 1 according to the second embodiment will be described with reference to FIG. 7. The configuration of the hydrogen engine 1 according to the second embodiment is basically similar to the configuration of the hydrogen engine 1 according to the first embodiment. Therefore, portions different from the configuration of the hydrogen engine 1 according to the first embodiment will be mainly described below.

Figure 7:
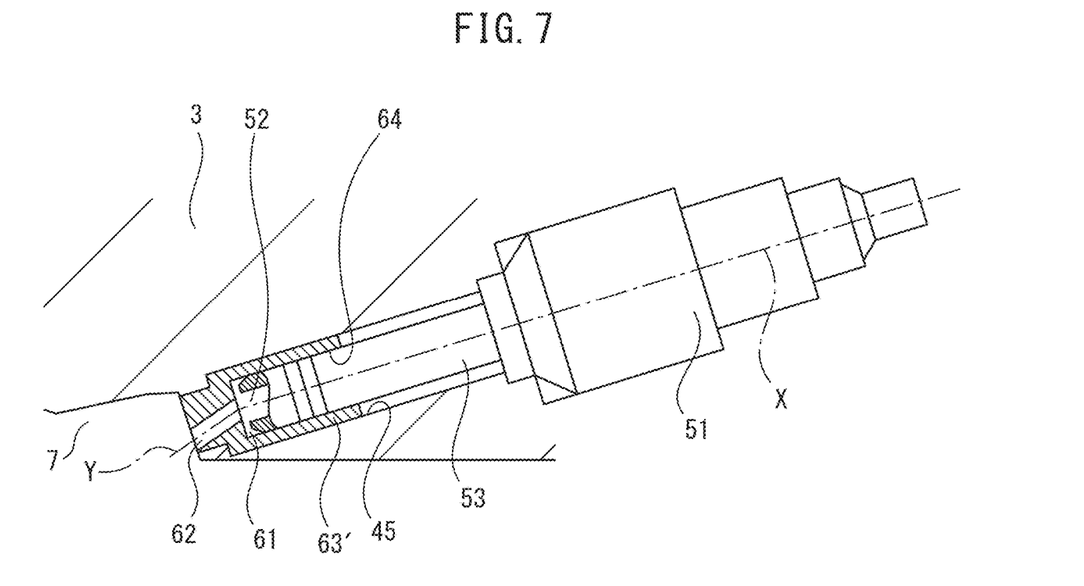
FIG. 7 is a cross-sectional view, similar to FIG. 4, showing an enlarged portion of the cylinder head around the injector according to the second embodiment.

FIG. 7 is an enlarged cross-sectional view, similar to FIG. 4, showing a portion of the cylinder head 3 around the injector 51 according to the second embodiment. As shown in FIG. 7, the hole 45 formed in the cylinder head 3 is formed such that a cross-sectional shape perpendicular to the axial direction thereof is larger than a cross-sectional shape of the cylindrical portion 53 of the injector 51. In the present embodiment, a pressure accumulation chamber defining member 63' is provided between the inner surface of the hole 45 and the outer surface of the cylindrical portion 53 in the vicinity of the distal end portion of the cylindrical portion 53 of the injector 51. The pressure accumulation chamber defining member 63' is provided between the injector 51 and the combustion chamber 7, and functions as a pressure accumulation chamber defining portion defining the pressure accumulation chamber 61 and the communication hole 62. Therefore, in the present embodiment, the pressure accumulation chamber defining portion is configured as a member separate from the cylinder head 3 defining the combustion chamber 7.

In the present embodiment, the pressure accumulation chamber defining member 63' is formed of the same material as the cylinder head 3, and therefore of a metal such as an aluminum alloy or cast iron. Therefore, in the present embodiment, the pressure accumulation chamber defining member 63' has the same thermal conductivity and corrosion resistance as the cylinder head 3. However, the pressure accumulation chamber defining member 63' may be formed of another material having thermal conductivity greater than or equal to the thermal conductivity of the cylinder head 3 used as the combustion chamber wall. In addition, the pressure accumulation chamber defining member 63' may be formed of another material having corrosion resistance higher than or equal to the corrosion resistance of the cylinder head 3. Specifically, the pressure accumulation chamber defining member 63' may be formed of, for example, beryllium copper.

As shown in FIG. 7, the pressure accumulation chamber defining member 63' has a hole 64 into which the injector 51 is inserted. The hole 64 is formed so that a cross-sectional shape perpendicular to the axial direction thereof is substantially the same as or slightly larger than the cross-sectional shape of the cylindrical portion 53 of the injector 51. Further, the pressure accumulation chamber defining member 63' is press-fitted into the hole 45 of the cylinder head 3, and is configured so that the tip end of the injector 51 does not reach the bottom surface of the hole 64 of the pressure accumulation chamber defining member 63' when the injector 51 is inserted. As a result, the pressure accumulation chamber 61 is formed between the tip of the injector 51 and the bottom surface of the hole 64 of the pressure accumulation chamber defining member 63'.

According to the present embodiment, since the pressure accumulation chamber defining portion is configured as a member separate from the cylinder head 3, the communication hole 62 can be easily formed, and thus the processing accuracy of the communication hole 62 can be improved. In addition, the pressure accumulation chamber defining portion can be formed of a material having higher thermal conductivity and corrosion resistance than the cylinder head 3, whereby the cooling property around the tip end of the injector 51 can be enhanced, and deformation of the shape, clogging, or the like due to corrosion of the communication hole 62 can be suppressed.

Third Embodiment

Next, referring to FIGS. 8 to 12B, a hydrogen engine 1 according to a third embodiment will be described. The configuration of the hydrogen engine 1 according to the third embodiment is basically similar to the configuration of the hydrogen engine 1 according to the first embodiment. Therefore, portions different from the configuration of the hydrogen engine 1 according to the first embodiment will be mainly described below.

Figure 8:
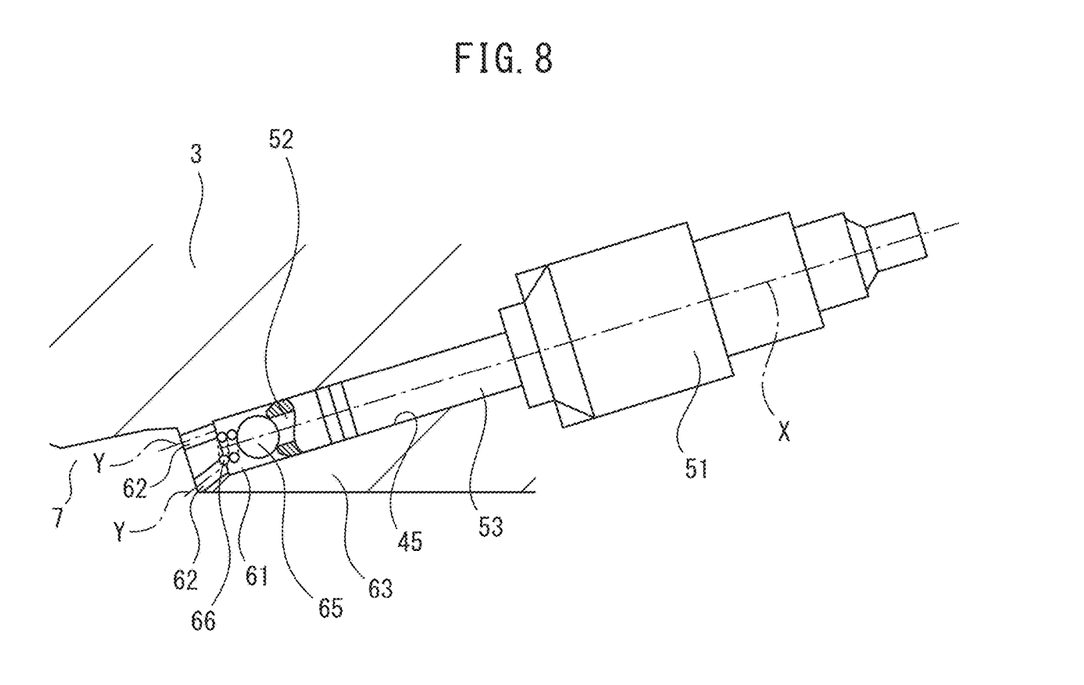
FIG. 8 is a cross-sectional view, similar to FIG. 4, showing an enlarged portion of the cylinder head around the injector according to the third embodiment.

FIG. 8 is an enlarged cross-sectional view, similar to FIG. 4, showing a portion of the cylinder head 3 around the injector 51 according to the third embodiment. As shown in FIG. 8, the engine 1 according to the present embodiment includes a spherical check valve 65 and a coil spring 66 that biases the check valve 65 toward the injection hole 52 of the injector 51.

Figure 9A:
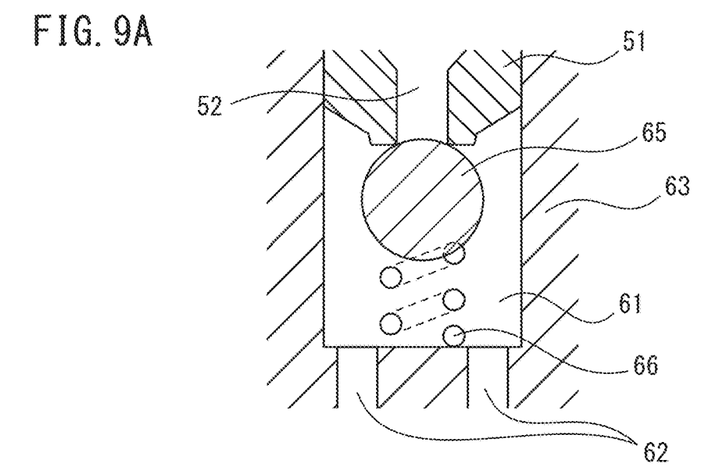
FIGS. 9A to 9C are views schematically showing an operation of a check valve.
Figure 9B:
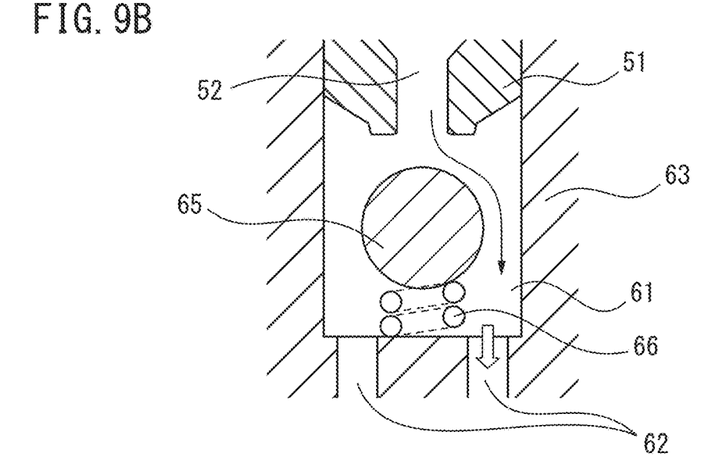
Figure 9C:
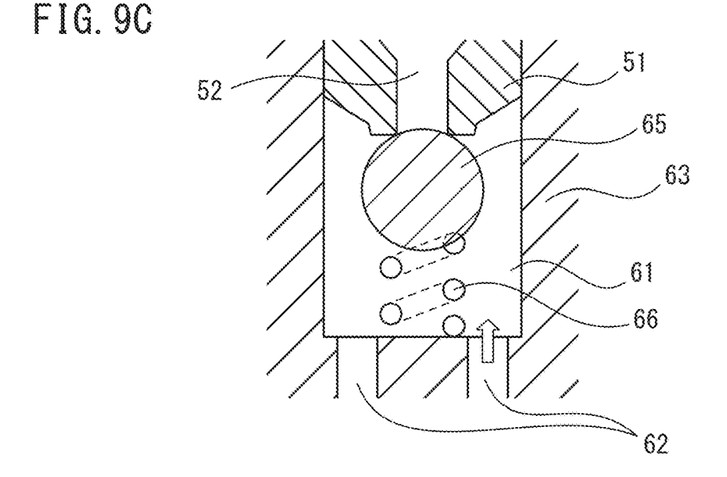

The check valve 65 and the coil spring 66 are provided in the pressure accumulation chamber 61. The check valve 65 and the coil spring 66 are arranged such that their axes coincide with the axis X of the injection hole 52 of the injector 51. The coil spring 66 is disposed so as to be placed on an end surface of the pressure accumulation chamber 61 where the communication hole 62 opens. The check valve 65 is disposed between the coil spring 66 and the injector 51. FIGS. 9A to 9C are views schematically showing the operation of the check valve 65.

FIG. 9A shows a state where no hydrogen gas is injected from the injector 51 and no combustion of the air-fuel mixture is occurring in the combustion chamber 7. Further, FIG. 9B shows a state where hydrogen gas is injected from the injector 51. In addition, FIG. 9C shows a state where the combustion of the air-fuel mixture occurs in the combustion chamber 7.

As shown in FIG. 9A, when the hydrogen gas is not injected from the injector 51 and the combustion of the air-fuel mixture is not generated in the combustion chamber 7, the check valve 65 is biased by the coil spring 66 to the injection hole 52 of the injector 51 to close the injection hole 52. Then, as shown in FIG. 9B, when the hydrogen gas is injected from the injector 51, the check valve 65 is opened by the pressure of the hydrogen gas. In other words, the coil spring 66 biases the check valve 65 to the injection hole 52 by a biasing force such that the check valve 65 is opened by the pressure of the hydrogen gas when the hydrogen gas is injected from the injection hole 52. As a result, the hydrogen gas flows from the injector 51 toward the communication hole 62. On the other hand, as shown in FIG. 9C, when the combustion of the air-fuel mixture occurs in the combustion chamber 7, the check valve 65 is closed by the pressure in the combustion chamber 7. As a result, the gas generated by the combustion in the combustion chamber 7 is prevented from flowing into the injection hole 52 of the injector 51 via the communication hole 62 and the pressure accumulation chamber 61. In other words, in the present embodiment, the check valve 65 is configured to allow the flow of the hydrogen gas (fluid) from the injector 51 to the communication hole 62 and to prohibit the flow of the combustion gas (fluid) from the communication hole 62 to the injector 51.

According to the present embodiment, the check valve 65 prevents the combustion gas from flowing backward from the combustion chamber 7 through the injection hole 52 into the injector 51. Therefore, the durability of the injector 51 can be increased.

In the third embodiment, the check valve 65 is a spherical valve, and the coil spring 66 is used as a biasing member that biases the check valve 65 toward the injection hole 52 of the injector 51. However, a valve of any shape other than a spherical valve, such as a plate valve or a cylindrical valve, can be used as the check valve 65. As the biasing member, any elastic member such as a disc spring or a leaf spring can be used.

FIGS. 10A to 12B are views schematically showing configurations around the pressure accumulation chamber 61. In particular, FIGS. 10A to 12B show configurations around the pressure accumulation chamber 61 in which the check valves 65 and the biasing members have configurations differing from each other.

Figure 10A:
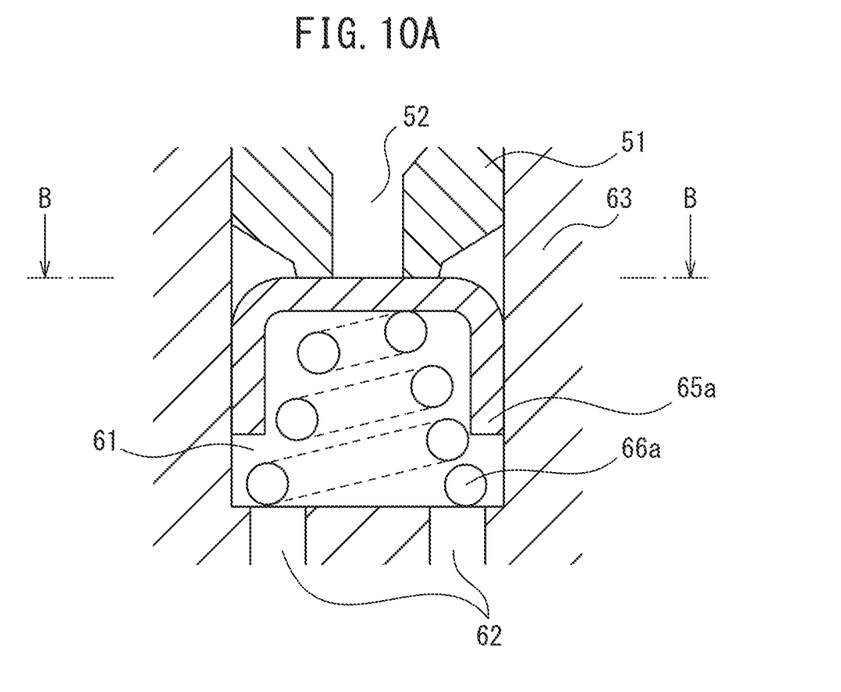
FIGS. 10A and 10B are views schematically showing a configuration around the pressure accumulation chamber.
Figure 10B:
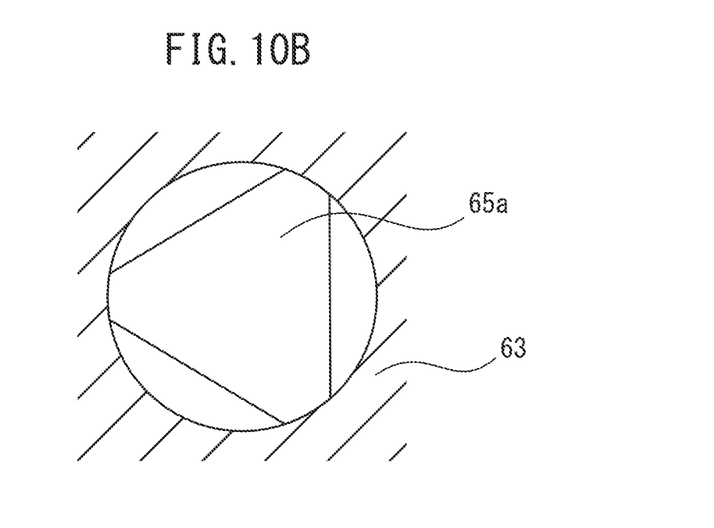

FIGS. 10A and 10B show an embodiment in which a plate valve 65a is used as a check valve, and a conical coil spring 66a is used as a biasing member. FIG. 10A shows a cross-sectional view around the pressure accumulation chamber 61, and FIG. 10B shows a cross-sectional view around the pressure accumulation chamber 61 as viewed along the line B-B of FIG. 10A. As shown in FIG. 10B, the plate valve 65a is configured such that its outer periphery partially contacts the inner surface of the pressure accumulation chamber defining portion 63. This limits the displacement of the plate valve 65a in a direction perpendicular to the main flow direction of the hydrogen gas. In addition, the plate valve 65a is configured such that its outer circumference is partially spaced apart from the inner surface of the pressure accumulation chamber defining portion 63. This allows hydrogen gas to flow between the plate valve 65a and the inner surface of the pressure accumulation chamber defining portion 63.

Figure 11A:
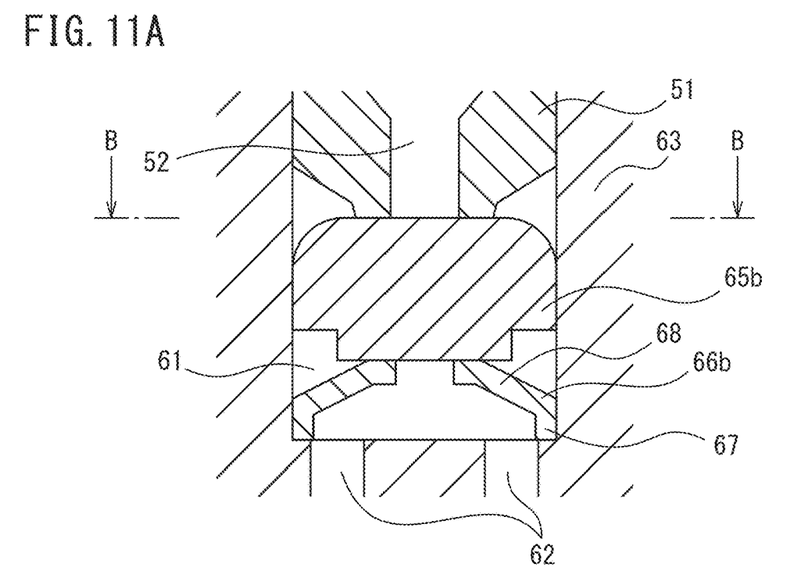
FIGS. 11A to 11C are views schematically showing a configuration around the pressure accumulation chamber.
Figure 11B:
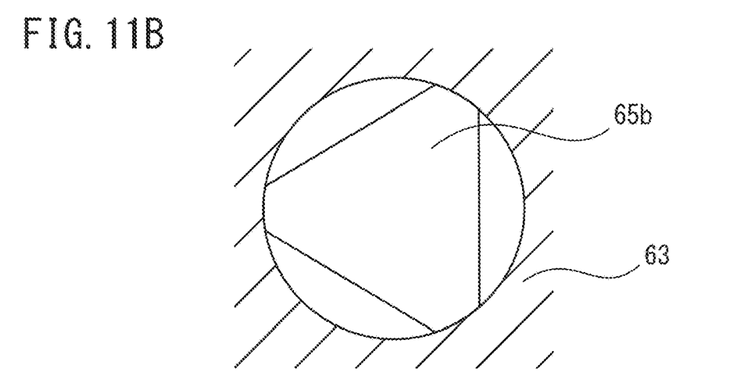
Figure 11C:
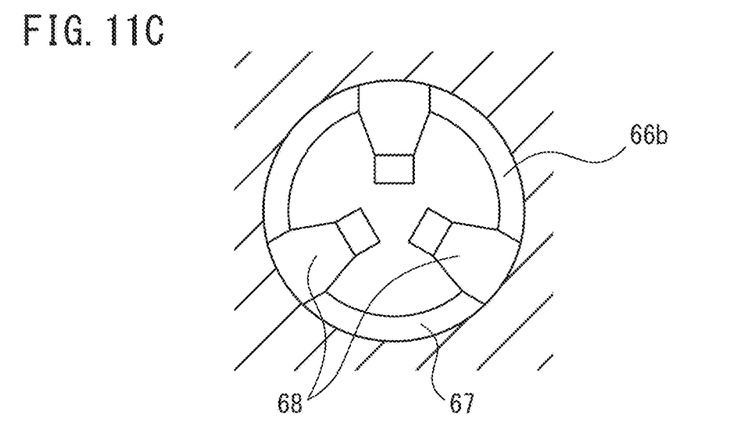

In addition, FIGS. 11A to 11C show an embodiment in which a cylindrical valve 65b is used as a check valve and a disc spring 66b is used as a biasing member. FIG. 11A shows a cross-sectional view around the pressure accumulation chamber 61, and FIG. 11B shows a cross-sectional view around the pressure accumulation chamber 61 as viewed along the line B-B of FIG. 11A. Further, FIG. 11C is a plan view of the disc spring 66b. As shown in FIG. 11C, the disc spring 66b has an annular portion 67 that contacts an inner surface of the pressure accumulation chamber defining portion 63 and is placed on the end surface where the communication hole 62 of the pressure accumulation chamber 61 opens, and a plurality of elastic portions 68 that extend inward from the annular portion 67. The plurality of elastic portions 68 bias the cylindrical valve 65b and are circumferentially spaced apart from each other such that the hydrogen gas flows through between the resilient portions 68.

Figure 12A:
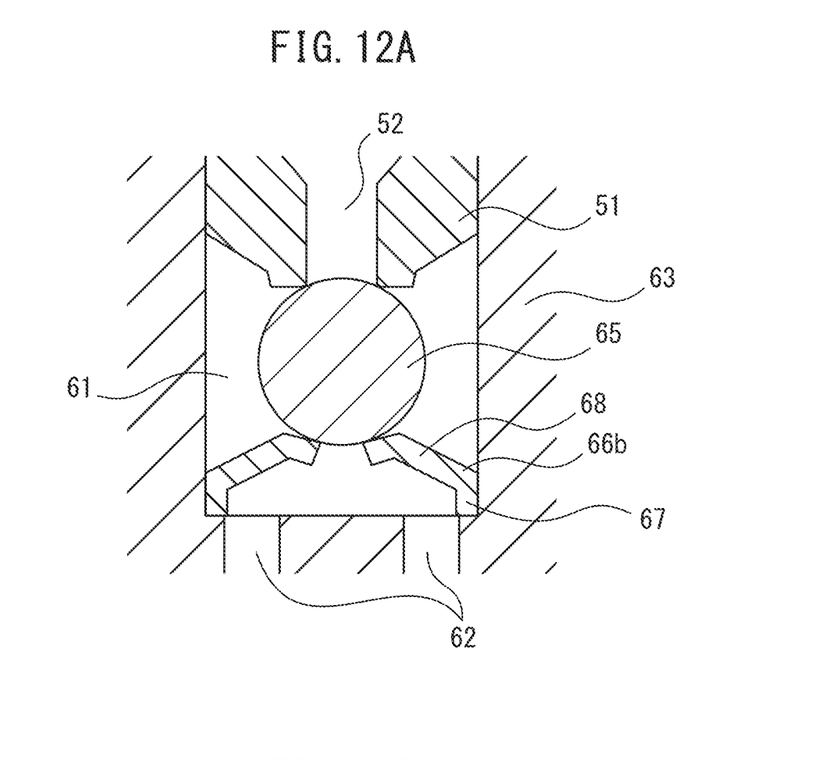
FIGS. 12A and 12B are views schematically showing a configuration around the pressure accumulation chamber.
Figure 12B:
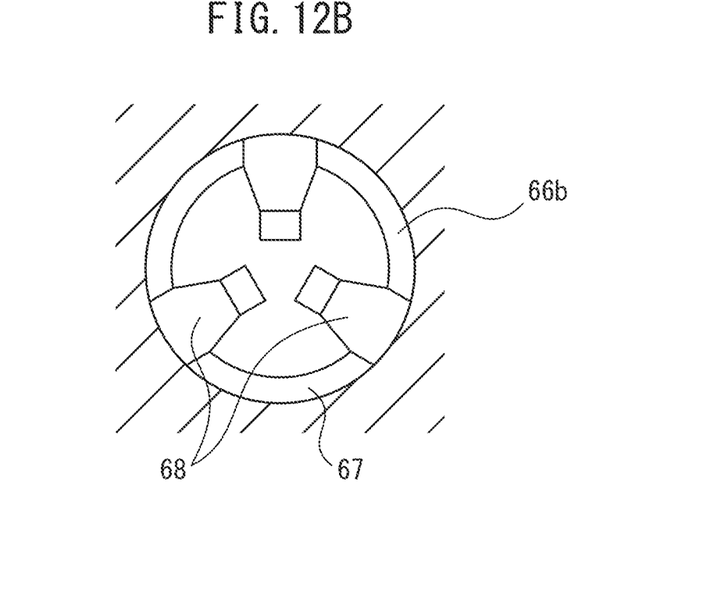

Further, in FIGS. 12A and 12B, a spherical valve 65 is used as a check valve, and a disc spring 66b is used as a biasing member. FIG. 12A shows a cross-sectional view around the pressure accumulation chamber 61, and FIG. 12B is a plan view of the disc spring 66b.

Figure 13:
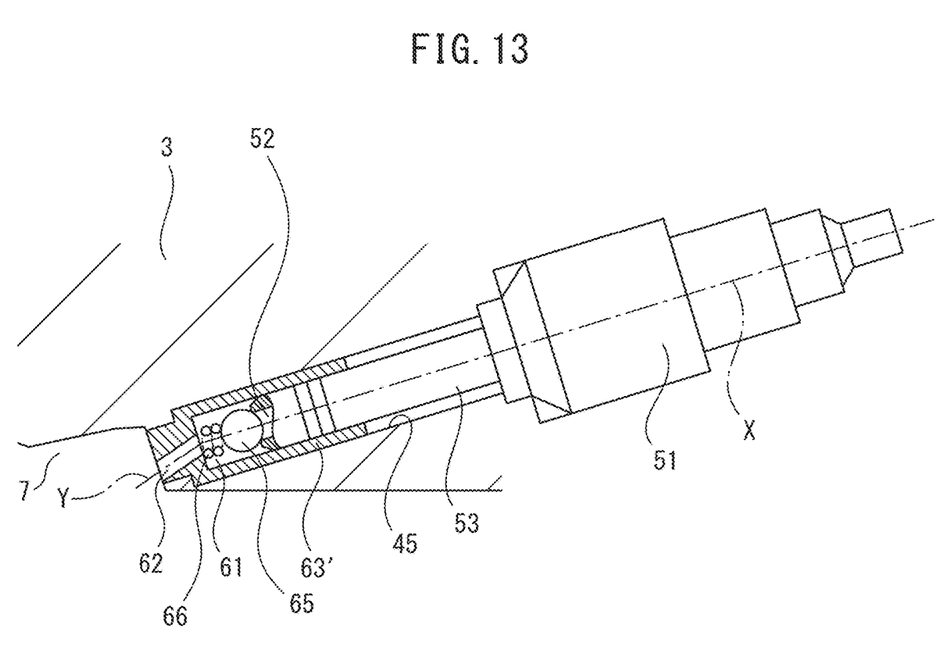
FIG. 13 is an enlarged cross-sectional view, similar to FIG. 4, showing a portion of the cylinder head around the injector when the pressure accumulation chamber defining member is provided.

In the third embodiment, the pressure accumulation chamber defining portion 63 is formed as a part of the cylinder head 3 as in the first embodiment. However, similarly to the second embodiment, the pressure accumulation chamber defining portion may be configured as a pressure accumulation chamber defining member 63' separate from the cylinder head 3. FIG. 13 is an enlarged cross-sectional view, similar to FIG. 4, showing a portion of the cylinder head 3 around the injector 51 when the pressure accumulation chamber defining member 63' is provided. In the example shown in FIG. 13, the pressure accumulation chamber defining member 63' is disposed in the hole 45 of the cylinder head 3, and the spherical check valve 65 and the coil spring 66 are disposed in the pressure accumulation chamber 61 defined by the pressure accumulation chamber defining member 63'.

Figure 14A:
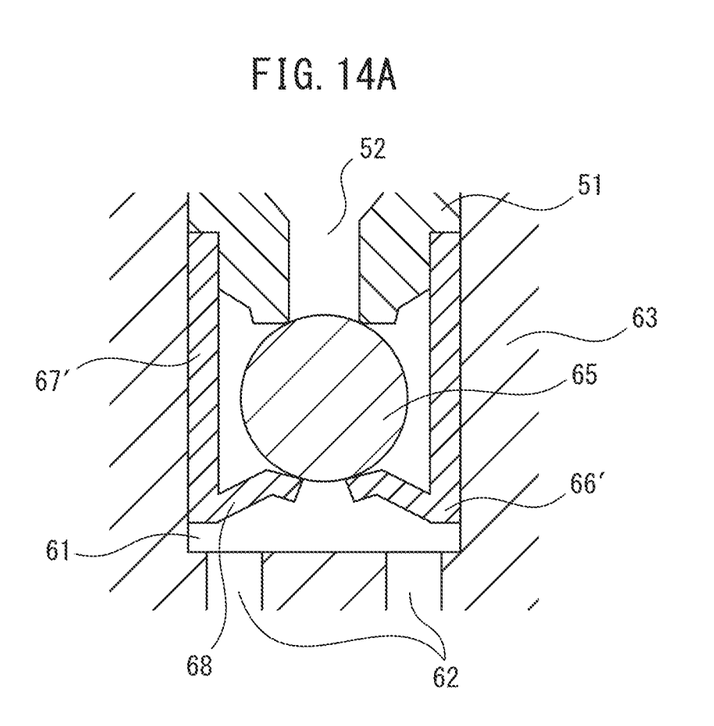
FIGS. 14A and 14B are views, similar to FIGS. 12A and 12B, schematically showing the configuration around the pressure accumulation chamber.
Figure 14B:
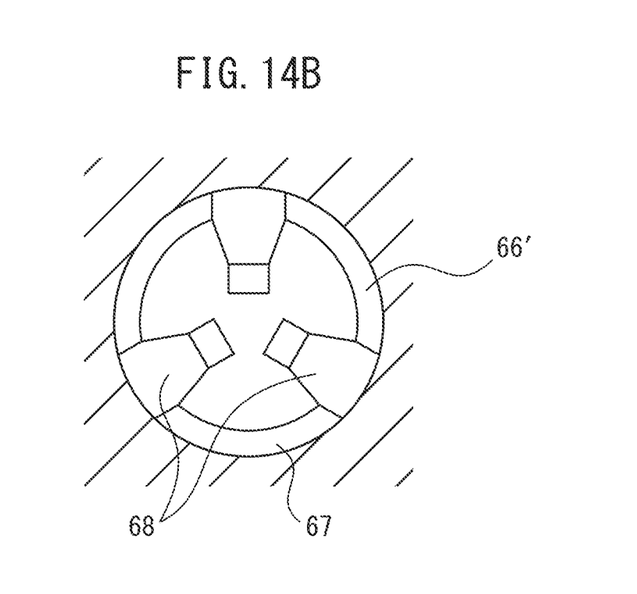

Further, in the third embodiment, the coil spring 66, which is a biasing member, is placed on an end surface of the pressure accumulation chamber 61 where the communication hole 62 opens. However, the biasing member may be fixed to the injector 51. FIGS. 14A and 14B are views, similar to FIGS. 12A and 12B, schematically showing the configuration around the pressure accumulation chamber 61. As shown in FIGS. 14A and 14B, the biasing member 66' has an annular portion 67' formed in a cylindrical shape and a plurality of elastic portions 68 extending inward from an end portion of the annular portion 67' positioned away from the injector 51. The end portion of the annular portion 67' on the injector 51 side is press-fitted onto the outer surface of the injector 51, and is thus fixed to the injector 51. Thus, in the embodiment shown in FIGS. 14A and 14B, the biasing member 66' is fixed to the injector 51. By fixing the biasing member to the injector 51 in this manner, the check valve and the biasing member can be easily assembled.

While preferred embodiments of the present disclosure have been described above, the present disclosure is not limited to these embodiments, and various modifications and changes can be made within the scope of the claims.

The invention claimed is:

1. A hydrogen engine in which hydrogen gas is supplied into a combustion chamber as fuel, comprising:
    an injector for injecting hydrogen gas;
    a pressure accumulation chamber communicating with an injection hole of the injector;
    a communication hole communicating with the pressure accumulation chamber and the combustion chamber; and
    a pressure accumulation chamber defining portion provided between the injector and the combustion chamber and defining the pressure accumulation chamber and the communication hole, wherein
    the pressure accumulation chamber defining portion is formed separately from the injector and has a thermal conductivity equal to or higher than a thermal conductivity of a combustion chamber wall defining the combustion chamber.

2. The hydrogen engine according to claim 1, wherein one or more of the communication holes are provided, and
    at least one of the communication holes is formed so as to have an axis that is angled with respect to an axis of the injection hole of the injector.

3. The hydrogen engine according to claim 2, further comprising a piston reciprocating in a cylinder defining the combustion chamber, wherein
    at least one of the communication holes is formed so as to have an axis that extends obliquely to a piston side in an injection direction with respect to the axis of the injection hole of the injector.

4. The hydrogen engine according to claim 2, further comprising a spark plug arranged to be exposed to the combustion chamber and igniting a mixture of hydrogen gas and air, wherein
    at least one of the communication holes is formed to have an axis that is inclined with respect to the axis of the injection hole of the injector so as to extend away from an ignition portion of the spark plug.

5. The hydrogen engine according to claim 4, wherein two or more communication holes are provided, and
    at least two of the communication holes are formed so as to have axes extending in directions spreading on both sides across the ignition portion of the spark plug when viewed in an axial direction of the combustion chamber.

6. The hydrogen engine according to claim 1, wherein the pressure accumulation chamber defining portion is configured as a part of a cylinder head defining the combustion chamber.

7. The hydrogen engine according to claim 1, wherein the pressure accumulation chamber defining portion is configured as a member separate from a cylinder head defining the combustion chamber.

8. The hydrogen engine according to claim 1, wherein the communication hole is formed such that a total flow path cross-sectional area thereof is smaller than a flow path cross-sectional area of the pressure accumulation chamber so as to be a throttle with respect to the pressure accumulation chamber.

9. The hydrogen engine according to claim 8, wherein the communication hole is formed such that the total flow path cross-sectional area thereof is larger than a flow path cross-sectional area of a throttle portion of the injector so that a flow rate of the hydrogen gas in the throttle portion of the injector becomes a predetermined flow rate when the hydrogen gas is injected from the injector.

10. The hydrogen engine according to claim 1, wherein the pressure accumulation chamber is formed to have the same axis as the axis of the injection hole of the injector.

11. The hydrogen engine according to claim 1, further comprising a check valve provided in the pressure accumulation chamber, wherein
    the check valve permits a flow of fluid from the injector to the communication hole and prohibits a flow of fluid from the communication hole to the injector.

12. The hydrogen engine according to claim 11, further comprising a biasing member that biases the check valve toward the injection hole of the injector, wherein
    the biasing member is fixed to the injector.

* * * * *